(12) United States Patent
Fowler

(10) Patent No.: US 6,797,352 B2
(45) Date of Patent: Sep. 28, 2004

(54) HEMS, EDGES, PATCHES AND SEAMS FOR DURABLE, WATER REPELLANT WOVEN FABRIC, AND METHODS FOR MAKING THE SAME

(76) Inventor: Rick Fowler, 10019 15th Ave. Northwest, Seattle, WA (US) 98177

( * ) Notice: Subject to any disclaimer, the term of this patent is extended or adjusted under 35 U.S.C. 154(b) by 43 days.

(21) Appl. No.: 10/336,616

(22) Filed: Jan. 2, 2003

(65) Prior Publication Data

US 2003/0138586 A1 Jul. 24, 2003

Related U.S. Application Data

(60) Provisional application No. 60/345,757, filed on Jan. 4, 2002.

(51) Int. Cl.[7] .............................. B32B 3/04; B32B 3/06
(52) U.S. Cl. ........................ 428/57; 428/122; 428/193; 428/194; 112/419
(58) Field of Search ................................ 428/122, 192, 428/61, 57, 99, 100, 193, 194; 2/275; 112/419

(56) References Cited

U.S. PATENT DOCUMENTS

| 5,364,678 A | 11/1994 | Lumb et al. ................... 428/96 |
| 5,660,914 A | 8/1997 | Essig et al. .................. 428/110 |

FOREIGN PATENT DOCUMENTS

| WO | WO 93/05958 | 4/1993 |
| WO | WO 94/17992 | 8/1994 |
| WO | WO 00/13889 | 3/2000 |
| WO | WO 00/63007 | 10/2000 |
| WO | WO 00/70975 A1 | 11/2000 |
| WO | WO 01/03919 A1 | 1/2001 |
| WO | WO 01/07174 A1 | 2/2001 |
| WO | WO 01/92009 A1 | 12/2001 |

*Primary Examiner*—Alexander S. Thomas
(74) *Attorney, Agent, or Firm*—Seed IP Law Group PLLC

(57) ABSTRACT

Edges, hems, patches and seams for woven fabric that has been treated for water repellency, and methods for making the same, are shown and described. In one particular embodiment of the invention, for example, a lapped seam between two pieces of water repellent fabric has an outer material at least partially overlapping an inner material, and a laminate strip positioned between the overlapping portions of the materials. The outer and inner materials, which are both oriented in the same direction, have an exterior layer of woven fabric that has been treated with water repellent and/or stain repellent chemicals, and an inner layer comprising a polymer membrane, such as polyurethane. The laminate strip has a bottom portion in contact with the outer layer of the inner material. The bottom portion has a low melt point, high flow rate adhesive system of one or more layers that penetrates and surrounds the fibers in the woven fiber of the outer layer of the inner piece of material. The laminate strip also has a top layer in contact with the inner layer of the outer piece of material. The top layer of the laminate is a thin, elastic, highly abrasion resistant material with a strong bonding affinity for polyurethane. The layers of the laminate strip bond to the adjacent layers of the overlapped material to create a strong lap seam.

37 Claims, 11 Drawing Sheets

HEMS, EDGES, PATCHES AND SEAMS FOR DURABLE, WATER REPELLANT WOVEN FABRIC, AND METHODS FOR MAKING THE SAME

CROSS-REFERENCE TO APPLICATIONS

The present application claims priority from U.S. Provisional Patent application Ser. No. 60/345,757, filed Jan. 4, 2002, the entire contents of which is incorporated herein by reference.

BACKGROUND OF THE INVENTION

1. Field of the Invention

The present invention relates to woven fabric that has been treated for water or stain repellency, and in particular, to hems, edges, patches and seams for such fabrics, and to methods of making the same.

2. Description of the Related Art

State-of-the-art woven fabrics used for outdoor clothing and other articles are commonly treated to make the fabric water and/or stain repellent (collectively referred to herein as "water repellent"). For example, some fabrics are impregnated with a silicone resin. Water repellent woven fabrics have clear advantages. At the same time, however, fabrics treated for water repellency have a number of disadvantages. Most notably, water repellent finishes, while advantageously repelling water, also repel liquid adhesives, whether they be liquid at ambient temperature or melted at elevated temperatures. As a result, it has become an important challenge in the outdoor fabric industry to find a means for affixing patches, seam-sealing tapes and other materials to the external surface of water repellent woven fabric.

Water repellent articles generally fall into two categories: articles having a waterproof external layer, and articles having a vapor permeable membrane covered with a woven, water repellent fabric. The first group, which generally comprises rain slickers, ponchos and similar articles, uses a monolithic external layer, such as PVC, which is inherently waterproof. Because the outer layer is monolithic in nature and because the material can typically be welded, as opposed to sewn, such articles can be truly waterproof. For the same reasons, however, such articles can be heavy and can become stiff in cold weather. In addition, such articles do not allow water vapor to escape from within the article, and thus can cause discomfort due to internal condensation.

The second group of articles, such as the now famous GORE-TEX fabric, combines a waterproof but breathable internal membrane with a water repellent external woven fabric. The internal membrane allows water vapor to pass through, such as when an individual is exercising in a jacket and the moisture content inside the jacket increases. Water vapor exits through the membrane to reduce or prevent condensation on the inside of the jacket, which can maintain the individual drier and warmer. The external layer of woven fabric protects the internal layer from physical damage and helps prevent the membrane from being saturated. If the exterior surface of the membrane is saturated with water, the water itself inhibits vapor from passing through the membrane. Accordingly, it can be very important to keep the external surface of the membrane dry. Thus, the external, water repellent fabric helps prevent water from passing therethrough and being trapped against the membrane. In addition, the woven fabric resists tearing, such as when a branch or other article rubs across the material. In combination, the layers of fabric resist abrasion damage and prevent water from passing into the article, while at the same time allowing water vapor to exit the article.

Because the industry has failed to develop an adhesive that can bond with the exterior surface of water repellent woven fabrics and provide a strong, soft, lightweight and durable bond to a wide variety of textiles, all of the articles in this second group have generally required stitching, such as at the edges of the fabric, at the seams, where zippers or other articles attach to the fabric, or at the pockets. But more importantly, to prevent fraying at the edges of such fabric, the industry typically folds the edge over itself and stitches the fold. Stitching can create numerous leaks in an otherwise waterproof article, each hole allowing water to migrate through all layers of the material. Even where adhesives have been used, such as that illustrated in U.S. Pat. No. 4,604,152 to Liukko, it has still been necessary to stitch the edge of the fabric to prevent fraying. In the few cases when raw edges have been left present, a strong fraying potential remains that severely limits choices of fabrics or the cosmetically acceptable life of the garment.

To solve problems associated with stitching, the industry has developed tapes for application to the interior of the seams. The use of interior seam-sealing tape can be tedious and expensive, however, as the type of tape and adhesive must be carefully matched with the particular interior surface material, and the time, temperature and pressure associated with applying such tapes must be carefully controlled. In addition, such multi-layered, taped seams in conjunction with the turned back seam allowance add significant weight, stiffness, and cost to the resultant article. As many of these articles are used for athletic and competitive outdoor purposes, an increase in the weight and stiffness of the article is undesirable.

In addition, because the weight and bulk of such articles continue to be reduced for functionality purposes, such articles with reduced amounts of surface fiber in their top layers now are even more susceptible to damage from abrasion or other wear.

BRIEF SUMMARY OF THE INVENTION

The present invention is directed toward woven fabric that has been treated with water repellent and/or stain repellent chemicals, and that is covered at least in part by a laminate patch. The laminate patch has a bottom portion in contact with the outer, treated layer of the woven fabric. The bottom portion has an adhesive system with an adhesive having a low melt point and a high flow rate and that penetrates and surrounds the fibers in the woven fiber of the outer layer of the material. The bottom portion can also contain a primer/adhesive combination for further penetration and greater bonding strength.

The patch can be shaped to cover an edge portion of the material, such as a hem or pocket flap, where there often exists a need to prevent fraying and/or delamination. The patch can also be shaped and positioned to cover a portion of the woven material that is subject to substantial abrasion, such as the elbow of a jacket.

The bottom portion of the laminate patch penetrates and surrounds the fibers of the woven material, bonding the laminate patch to the material and preventing delamination of the patch from the material and/or fraying of the material. In addition, the patch may provide additional abrasion resistance to that area of the material. The laminate strip has a top layer that is a thin, elastic, highly abrasion resistant material. In particular embodiments of the invention, other structures, such as hook and/or loop patches can be bonded onto the upper portion of the laminate patch, as the laminate patch has not been treated in the same manner as the woven material and thus the outer patch can stick to the laminate patch with traditional adhesives.

Another embodiment of the invention is directed toward stitchless seams for water repellant woven fabric, and toward methods for making the same. The fabric has an exterior layer of woven fabric that has been treated with water repellent and/or stain repellent chemicals, and an inner layer comprising a polymer membrane, such as polyurethane.

In one particular embodiment, a lapped seam is formed with a top material at least partially overlapping a bottom material, and a laminate strip positioned between the overlapping portions of the materials. The top and bottom materials are both oriented with their exterior layers facing in the same direction. The laminate strip has a bottom portion in contact with the outer layer of the bottom material. The bottom portion has a low melt point, high flow rate adhesive that penetrates and surrounds the fibers in the woven fiber of the outer layer of the bottom piece of material. The laminate strip also has a top layer in contact with the inner layer of the top piece of material. The top layer of the laminate is a thin, elastic material with a strong bonding affinity for polyurethane. The two layers of the laminate strip bond to the adjacent layers of the overlapped material to create a strong lap seam. In particular embodiments of the invention, one or both of the laminate layers also penetrates the material sufficiently to prevent the edge of the material from delaminating and/or from fraying.

Yet another embodiment of the present invention is directed toward a seam between two pieces of woven material that have been treated with water repellent and/or stain repellent chemicals, and that is covered by a laminate patch. The seam can be bonded with a laminate patch as described above, can be sewn, or can be formed by any other means generally understood in the art. The bottom portion of the laminate patch is bonded to the water repellent woven fabric and covers any stitching in the seam to prevent water migration through the stitching holes and to prevent fraying of the edges of the material.

In still another embodiment of the present invention, an accessory such as a zipper is bonded with a laminate patch to the edge of a woven material treated with a water repellent and/or stain repellent chemical. The laminate patch can effectively prevent the edge of the material from fraying and/or delaminating, while at the same time strengthening the bond of the accessory to the edge of the material.

The present invention is also directed toward methods of manufacturing such patches, edges, and seams.

DETAILED DESCRIPTION OF THE INVENTION

The present invention is directed toward hems, edges, patches and seams for woven fabrics that have been treated with water repellent and/or stain repellent chemicals, and toward methods of making the same. Embodiments of the present invention allow articles manufactured from such materials, such as clothing, to be bonded without stitching, preventing migration of water through the article, while providing exceptional abrasion resistance. Many specific details of certain embodiments of the invention are set forth in the following description and are illustrated in FIGS. 1–31 to provide a thorough understanding of such embodiments. One skilled in the art, however, will understand that the present invention may have additional embodiments, or may be practiced without several of the details described in the following description.

Figure 1:
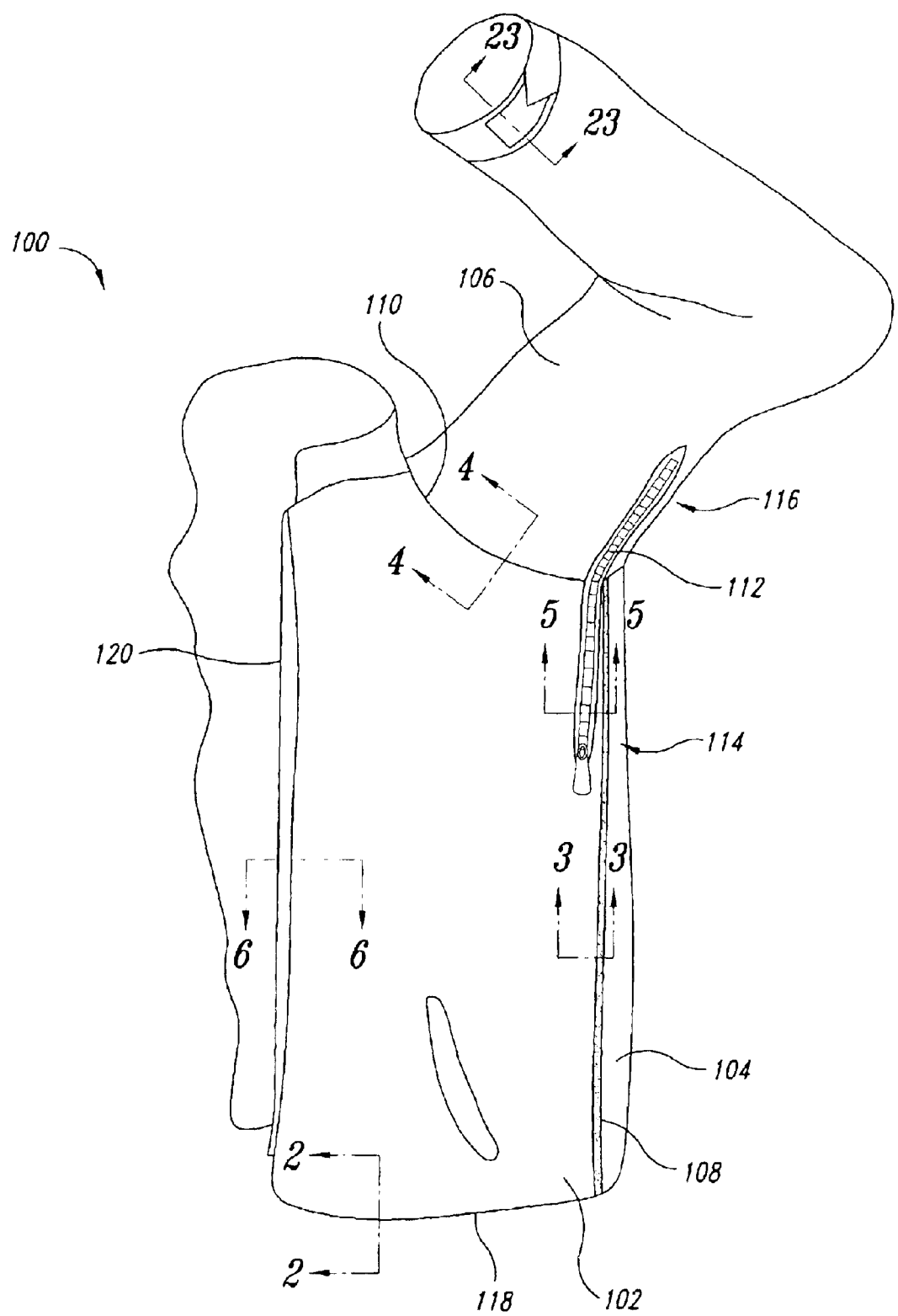
FIG. 1 is a perspective view of a portion of an article of clothing according to one embodiment of the present invention.

FIG. 1 illustrates a portion of an article 100 of clothing according to an embodiment of the present invention. The inventor appreciates that the article 100 can take the form other types of clothing, such as pants, or can take the form of other products altogether, such as a tent, and umbrella, or a wide variety of other articles. The article 100 is thus provided for illustration purposes only.

The article has a first panel 102 of a layered, water repellant fabric, a second panel 104 of a layered water repellent fabric, and a third panel 106 of layered water repellent fabric. The first panel 102 is attached to the second panel 104 at a first seam 108, and the first and second panels 102/104 are attached to the third panel 106 at a second seam 110. A zipper 112 is positioned along an opening within the first and third panels 102/106. Thus, at a first end 114 of the zipper 112, the fabric of the first panel 102 is attached to opposing sides of the zipper, and at a second end 116 of the zipper, portions of the third panel 106 are attached to opposing sides of the zipper. A hem 118 is formed along one edge of the first panel 102. In addition, a fastener 120 is attached to another edge of the first panel 102. The fastener 120 can be one-half of another zipper, or any other suitable fastener.

Figure 2:
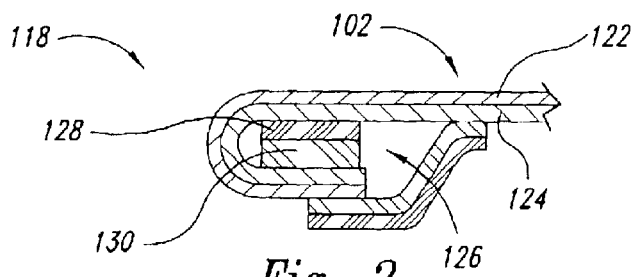
FIG. 2 is a cross section of a hem from the article of clothing of FIG. 1, viewed along Section 2—2.

FIG. 2 illustrates a cross-section of the hem 118 in the edge of the first panel 102. As is slightly better illustrated in this figure, the first panel 102 is a multi-layer, water repellent fabric having a woven textile outer layer 122, such as nylon, polyester, or another suitable material, that has been chemically treated for water repellency, using a fluorine-containing resin or other suitable substance, and having a membrane inner layer 124 that is bonded to the outer layer as generally understood in the art. The second and third panels 104/106 can be fabricated from similar, multi-layer fabrics.

A laminate strip 126 is positioned between the hem 118 and retains one portion of the first panel 102 in fixed relationship with an opposing portion of the first panel. The laminate strip 126 is made up of a top layer 128 bonded to a bottom portion 130. The top layer 128 can be a thin, elastic, highly abrasion resistant material with a strong bonding affinity for polyurethane and coatings and laminations comprising polyurethane. As such, the top layer 128 can bond extremely well to, among other things, the inner layer 124 of the multi-layer, water repellent fabric used for first panel 102 and the other panels.

The bottom portion 130 is an adhesive system having a low melt point and a high flow rate when activated, that penetrates and surrounds fiber bundles in a textile and reunites with itself to form a polymeric bond. The composition of the adhesive system, when activated, overcomes the water repellency and/or stain repellency of the treated fibers of the water repellent fabric, and as such, as discussed in more detail below, the bottom portion 130 is capable of forming a strong bond with the outer layer 122 of the multi-layer water repellent fabric, such as first panel 102 or the other panels.

The top layer 128 and the bottom portion 130 maintain a strong bond strength to each other under normal conditions. Thus, in combination, the top layer 128 and the bottom portion 130 are extremely effective, among other things, for bonding one piece of multi-layer water repellent fabric to another piece of multi-layer water repellent fabric.

In the illustrated embodiment, the laminate strip 126 is a polymeric strip wherein the top layer 128 measures 0.075 mm in thickness and the bottom portion 130 measures 0.10 mm in thickness. The particular material is identified by make and model no. T023, which is commercially available from the Ardmel Group located in the United Kingdom. The material of the top layer 128 can be polyurethane, including any of the known polyether polyurethanes. The material of the bottom portion 130 can be a blend of rubber, wax and solvents, including organic solvents and other known solvents. In alternate embodiments, the bottom portion 130 can be comprised of a two-part adhesive system: a primer comprising rubber, wax and solids; and a co-polyester that follows the primer into the fibers of the treated fiber, together creating a deep and strong bond with the treated fiber. After reviewing this disclosure, an individual of skill in the art will appreciate that a variety of compositions and composition combinations would be suitable for substitution. Similarly, the thickness of the top layer 128 can range from 0.020 mm to 0.250 mm, and the thickness of the bottom portion can range from 0.025 mm to 0.250 mm. In addition another laminate strip can be positioned over the edge of the hem to protect a weakly laminated or heavily fraying fabric from abrasion.

Figure 3:
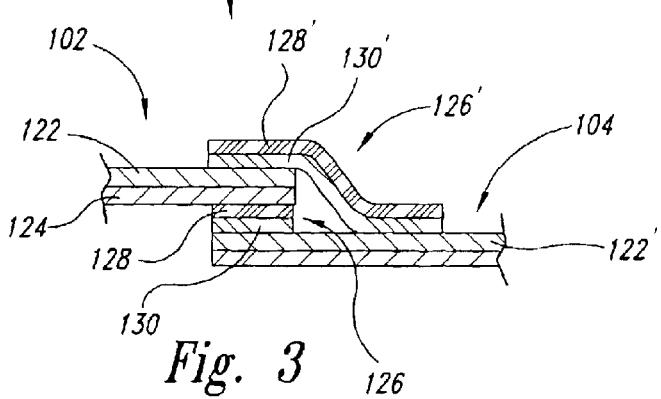
FIG. 3 is a cross section of a seam from the article of clothing of FIG. 1, viewed along Section 3—3.
Figure 4:
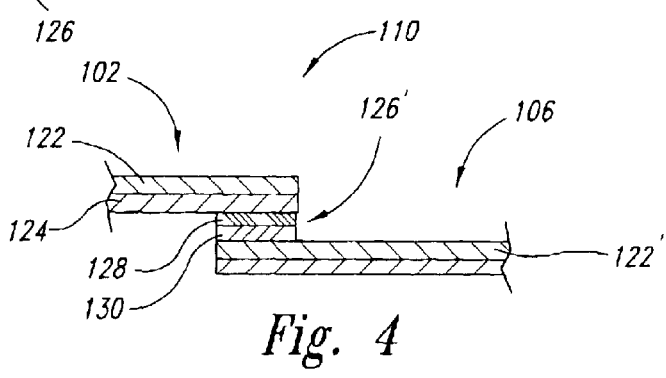
FIG. 4 is a cross section of another seam from the article of clothing of FIG. 1, viewed along Section 4—4.

FIGS. 3 and 4 illustrate the first seam 108 and the second seam 110, respectively. In FIG. 3, the first panel 102 is lapped over the second panel 104, and in FIG. 4 the third panel 106 is lapped over the first panel. The outer layer of the second panel 104 is referenced as 122' and the outer layer of the third panel 106 is referenced as 122". In both lapped seams, the inner layer 124 of the first panel 102 is bonded with the top layer 138 of the laminate strip 126. The bottom portion 130 of the laminate strip 126 is bonded to the respective outer layer 122'/122". The bonds between each of these layers is sufficiently strong to resist the forces generally experienced during regular conditions, and are durable enough to maintain the bond over repeated cycles of use and washing.

In FIG. 3, the lap seam is encapsulated by an additional laminate strip 126'. The additional laminate strip 126' extends between the outer layer 122' of the first panel 102 and the outer layer 122" of the second panel 104. The bottom portion 130' of the additional laminate strip 126' is bonded to both outer layers 122/122'. This additional laminate strip 126' provides not only additional strength to the lap seam, but also provides substantial resistance to abrasion damage that could otherwise be exacerbated by the elevated profile of the first panel 102 above the second panel 104. The top layer 128' of the additional laminate strip 126' is sufficiently durable to resist damage during the inevitable abrasive activities experienced by outdoor equipment.

Figure 5:
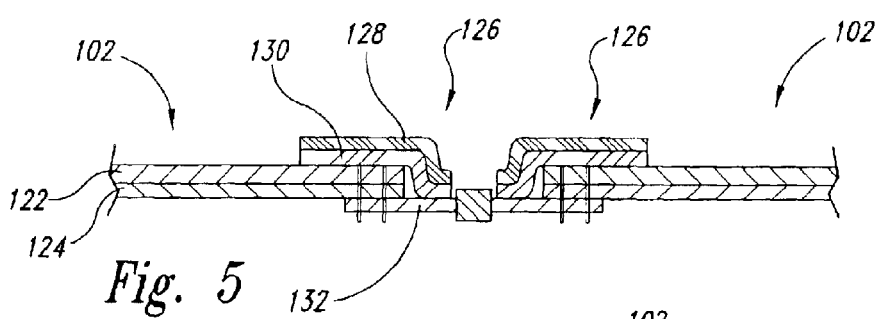
FIG. 5 is zipper from the article of clothing of FIG. 1, viewed along Section 5—5.

FIG. 5 is a cross-sectional view of the zipper 112 of the illustrated embodiment of the invention. An opposing half of a length of zipper tape 132 is stitched to an edge of the first panel 102 at opposing sides of an opening therebetween. Two lengths of laminate strips 126 extend side-by-side along the length of the zipper 112, and abut each other to seal the zipper from an external environment. The bottom portion 130 of each laminate strip 126 is bonded to the outer layer 122 of the first panel 102. It is appreciated that the zipper 112 could be fabricated without stitching, as illustrated by the fastener 120 in FIG. 6, or by other means generally available and understood by those of ordinary skill in the art.

Figure 6:
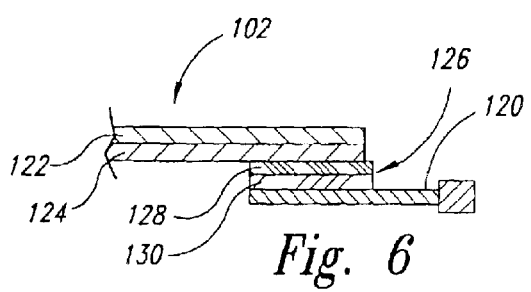
FIG. 6 is a section of a fastener from the article of clothing of FIG. 1, viewed along Section 6—6.

FIG. 6 illustrates one-half of a fastener 120 bonded to the bottom portion 130 of the laminate strip 126. The top layer 128 of the laminate strip 126 is bonded to the inner layer 124 of the first panel 102. The fastener 120 can be a zipper or any other suitable fastener. Similar to that discussed above, the fastener 120 can also be attached to the edge of the first panel 102 using stitches and sealed from the elements with an additional laminate strip 126.

Figure 7:
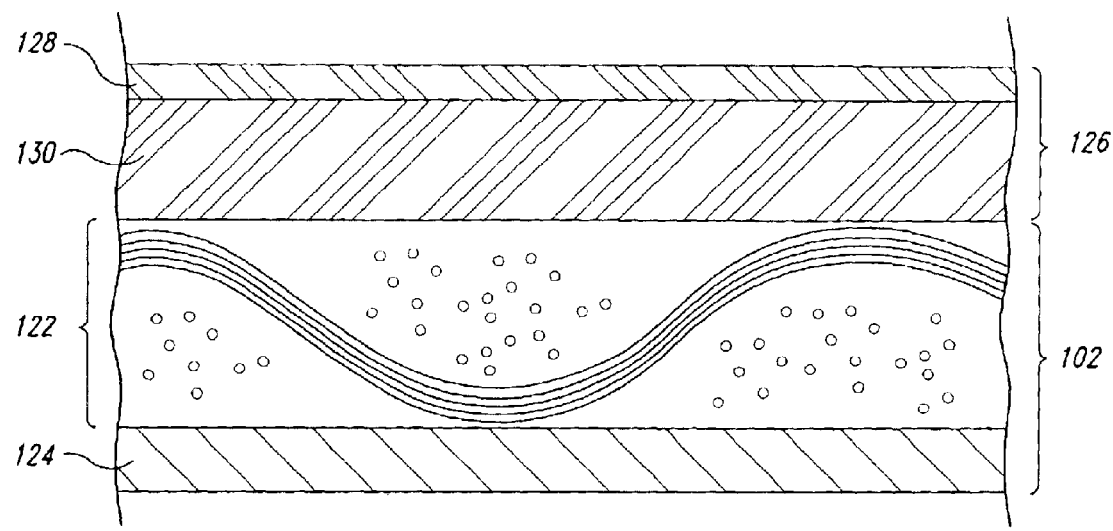
FIG. 7 is a cross section of a laminate tape in contact with a layered material having a water repellent outer fiber layer and an inner membrane layer, according to one particular embodiment of the present invention, shown prior to bonding.
Figure 8:
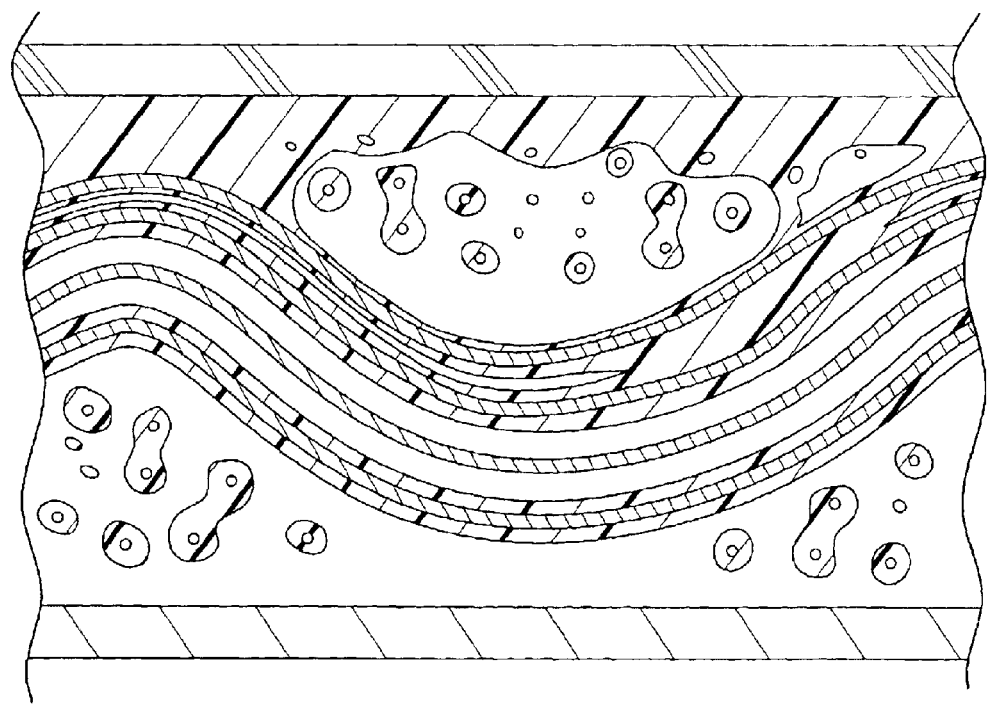
FIG. 8 is a cross section of the laminate tape and layered material of FIG. 7, shown after bonding.

FIGS. 7 and 8 further illustrate the laminate strip 126 and the multi-layer, water repellent fabric, such as that of first panel 102. FIG. 7 illustrates the laminate strip 126 prior to being bonded with the first panel 102, and FIG. 8 illustrates the combination after bonding has occurred. In FIG. 7, the bottom portion 130 of the laminate strip 126 is pressed against the woven outer layer 122 of the first panel 102.

To bond the illustrated laminate strip 126 with the first panel 102, heat and pressure are applied to the top layer 128 of the laminate strip. Heat pressing the laminate strip 126 at 180° C. for 10 seconds is sufficient to create a firm bond, as illustrated in FIG. 8. The inventor appreciates that other times and temperatures can be used, as discussed in the examples below. In FIG. 8, it can be seen that the bottom portion 130 has melted and has a sufficiently high flow rate to propagate through the fibers 134, against the forces of the water repellent chemicals with which the fibers have been treated. Depending on the temperature, pressure, duration of the application and fabric selection, it has been found that the material of the bottom portion 130 can penetrate the fibers 134 substantially, and in some instances completely, toward the inner layer 124, resulting in a waterproof seam. Where an additional layer of co-polyester is incorporated into the adhesive system, the heated co-polyester follows the heated bottom portion 130 deep into the fibers 134, adding additional strength to the bond between the laminate strip 126 and the fabric.

FABRICATION EXAMPLE I

TOP COVERED LAPSEAM

A.) Using an appropriate PU laminated waterproof textile, a seam was made by pre-setting Ardmel T023 black laminate tape on the top surface of a fabric edge to be joined using 4 bar pressure at 360C. air temperature and a feed rate of 3.5 meters/minute on an Ardmel Mk.6 rotary pneumatic seam sealing press (available form Ardmel Automation, Glenrothes, Fife. U.K.); the upper fabric was then positioned over the preset tape to form a lapseam and reveal a slightly visible edge of 0.25 to 1.0 mm.; another strip of Ardmel T023 was placed centered over the seam edge to form a cover to the seam edge. The composite was pressed in a flatbed ElectroSeal Versa Sealer pneumatic press at 180C for 12 seconds at 40 psi cylinder pressure.

As is shown in the testing summaries provided in the provisional application to which this application claims priority (i.e., Provisional Patent Application No. 60/345,757, filed Jan. 4, 2002, which is incorporated herein in its entirety by reference), seams made in this way with various tapes to properly match the textile and application can provide previously unseen levels of lightness of weight, flexibility (contributing to comfort), lack of bulk, tensile and peel strength, abrasion resistance, and waterproofness in a garment when used to replace sewn or sewn and adhesive seam-taped seams.

B.) A similar seam was produced by the use of a normal Ardmel Mk.6 seam taping machine for presetting the T023 laminate material as above, then subsequent joining and top welt setting in completed in one operation by the use of a Modified Ardmel Mk.6 seam taping machine, that utilizes a second horizontal hot air dispensing quill to deliver heat between the bottom and top layers of the lapseam during assembly. The modified machine utilizes a fabric guide assembly to position the layers properly in relationship to one another, and automatically dispenses the rolled T023, or similar, top cover material. The machine processes at 4 meters/minute, at a quill heat of 480C and 80 psi cylinder pressure.

FABRICATION EXAMPLE II

UNCOVERED ANTI-FRAY EDGE

The remarkable ability to surround and bind fibers of the Ardmel T023 welting tape is specially utilized in cases where the appearance of the edge of the fabric is highly desirable and may be preferred to the ultimate in antifray durability.

In this example, the Ardmel Mk. 6 seam sealer was used to set a strip of 13 mm T023 tape flush with the edge of the bottom portion of the intended lap seam with the fabric face upward, the top fabric layer is positioned face down 10 mm from the edge of the first fabric, and the T023 tape was pre-set using 4 bar pressure at 360C air temperature and a feed rate of 3.5 meters/minute. Subsequently the top layer of fabric was turned over to form the lap seam, using the T023 as a "hinge". The seam was pressed in a flatbed ElectroSeal Versa Sealer pneumatic press at 180C for 12 seconds at 40 psi cylinder pressure.

The resulting lap seam has an exposed fillet of the adhesive layer of the T023 tape visible along the edge of the lapseam and the adhesive wicks into the adjacent fibers of the top fabric edge providing substantial abrasion resistance.

FABRICATION EXAMPLE III

In this example, Ardmel T014 Clear polymer laminate was adhered to the surface of a fraying and abrasion prone dobby weave fabric. The section of fabric to be protected from abrasion had an overlay of the T014 material positioned directly on its surface and covered by silicone release paper. The assembly was inserted into a flatbed ElectroSeal Versa Sealer pneumatic press at 180C for 12 seconds at 40 psi cylinder pressure, removed and allowed to cool under random pressure applied by hand.

As can be seen in the attached photo the penetration of the adhesive is substantial enough to "wet out" and surround the fiber bundles and cancel most of their internal refraction of light, the prior art example shows no such apparent wetting. Cross sections of these textile/polymer composites show the T014 completely embedding the fibers and substantially eliminates fraying at the cut edge, where the prior art adhesive was pulled away by the cutting action of cross sectioning and readily allows fraying at the edge.

Figure 9:
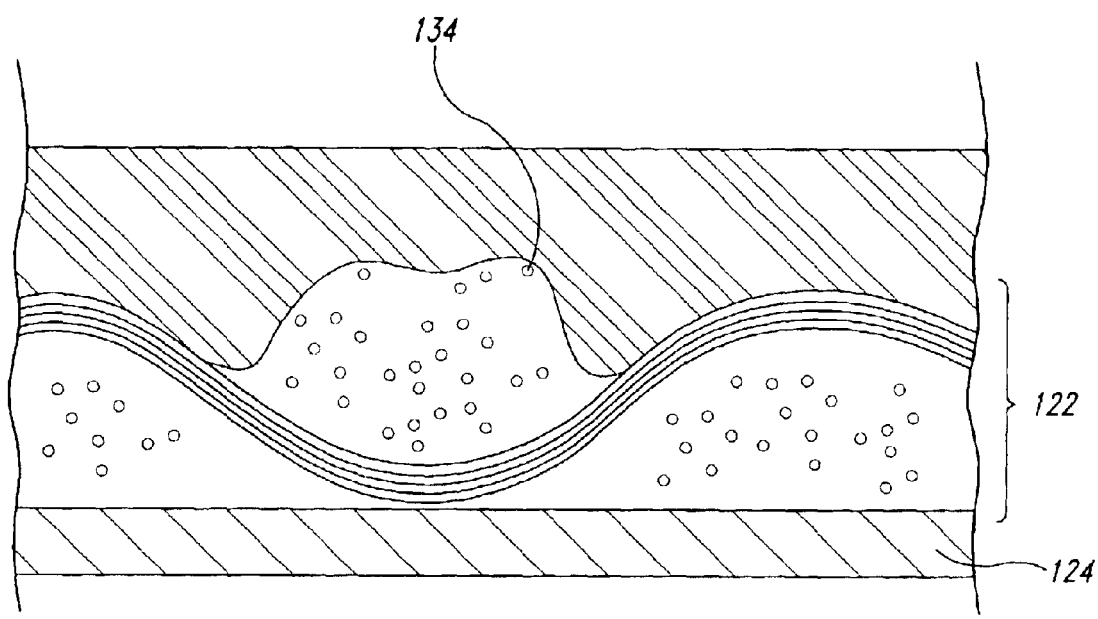
FIG. 9 is a cross section of an adhesive bonded to a layered material having a water repellent outer fiber layer, according to the prior art.

This success is extremely surprising, especially considering that for more than a decade the industry has been attempting to develop an adhesive tape that can penetrate fibers that have been treated with water repellent and/or stain repellent chemicals. As illustrated in FIG. 9, the adhesive A of the prior art typically only penetrates a few fibers deep into the outer layer 122, if at all.

Embodiments of the invention have numerous advantages over adhesives and adhesive tapes of the prior art. First, the laminate strip of the present invention is capable of bonding to the outer layer of a woven fabric that has been treated with water repellent and/or stain repellant chemicals. As a result, the laminate strip will not separate or delaminate from the fabric during useful life cycle of the standard outdoor article. In addition, the laminate strip exceeds 80 lb force as measured using an ASTM modified grab seam strength test. Still further, patches made from the laminate strip on the outside of the fabric have an abrasion resistance that exceeds uncovered raw edges by 20 to 300 times, and exceeds that of the base fabric by many times. Still further, the laminate strip exhibits water resistancy that resists water entry in excess of the industry norm of 2 psi for two minutes.

Figure 10:
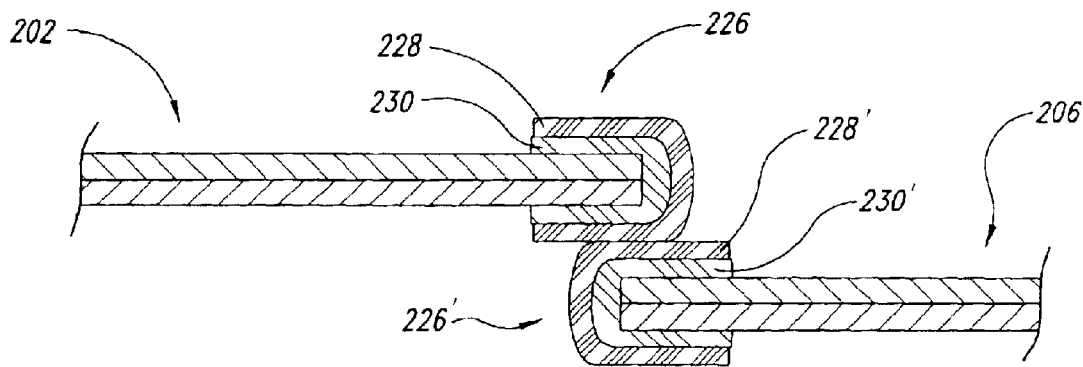
FIG. 10 is a sectional view of a lapped seam with encapsulated edges, according to an embodiment of the present invention.

FIGS. 10–23 illustrate a number of alternate embodiments of the present invention. FIG. 10 shows a portion of a first panel 202 configured in a lap seam with a portion of a second panel 206. The edge of the first panel 202 is encapsulated by a first laminate strip 226 and the edge of the second panel is encapsulated by a second laminate strip 226'. The inner layers 230/230' of the laminate strips 226/226' are in contact with the first and second panels 202/206 to prevent the panels from delaminating or fraying. The outer layers 228/228' are in contact with each other, and are bonded together to retain the lap seam in its functioning configuration.

Figure 11:
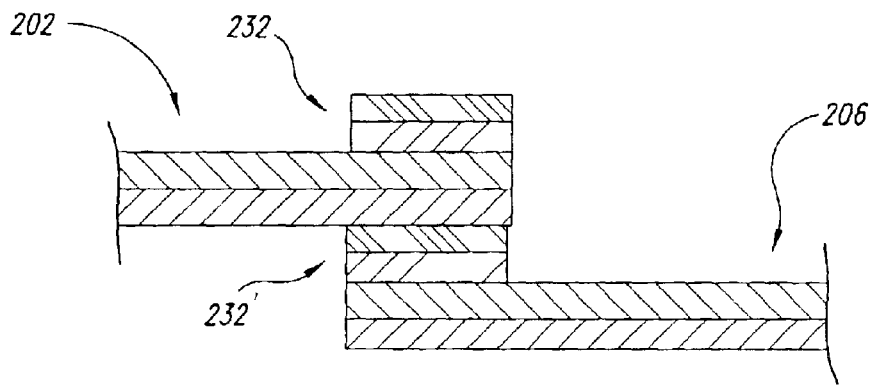
FIG. 11 is a sectional view of a lapped seam having a strip of laminate material affixed thereto to further prevent fraying and/or delaminating, according to an embodiment of the present invention.

FIG. 11 illustrates another alternative embodiment of a lap seam in which a section of the first panel 202 is attached to a section of the second panel 206. In this particular configuration, the inner layers of the laminate patches 232/232' are both attached to the treated outer, fiber layers of the panels 202/206, while the outer layer of the lower laminate strip 232' is attached to the inner, membrane layer of the outer panel 202. The inner layers of the laminate patches 232/232' penetrate the fibers of the panels 202/206 to resist fraying and delamination of the fabric layers.

Figure 12:
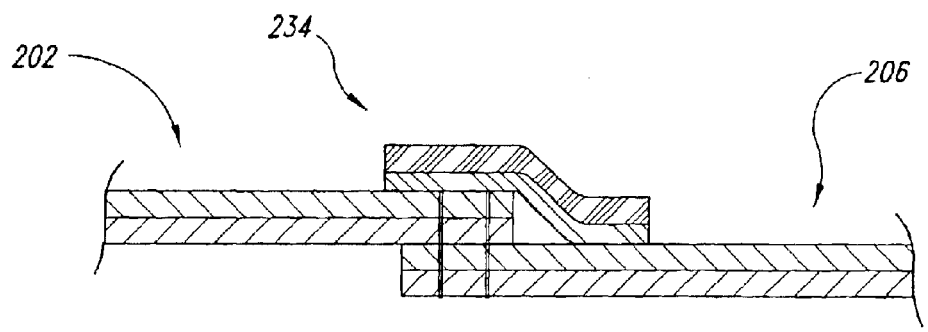
FIG. 12 is a sectional view of a stitched, lapped seam having a laminate patch affixed to the external layer thereof, according to an embodiment of the present invention.

FIG. 12 illustrates a stitched lap seam in which the first panel 202 is lapped over and stitched to the second panel 206. A laminate strip 234 is affixed to the outer surfaces of the panels 202/206, and extends over the seam and the stitching to prevent fraying and delamination of the top panel 202, and to prevent water from penetrating through the seam or along the stitches.

Figure 13:
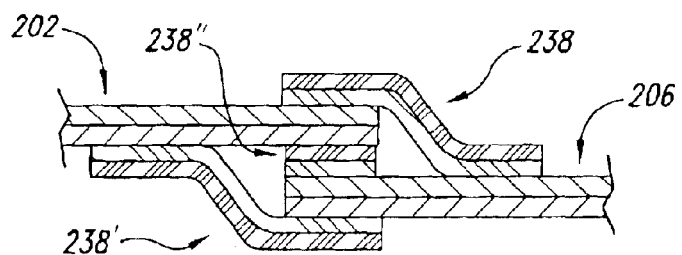
FIG. 13 is a sectional view of a covered, lapped seam having an internal laminate patch, according to another embodiment of the present invention.

FIG. 13 is a lap seam in which a first laminate strip 238 is affixed to the outer layers of the panels 202/206 and extends across the seam on the outside, a second laminate strip 238' is affixed to the inner layers of the panels and extends across the seam on the inside, and a third laminate strip 238" bonds the panels together. The first and second laminate strips 238/238' independently prevent liquid from passing through the seal, doubling the seam's effectiveness.

Figure 14:
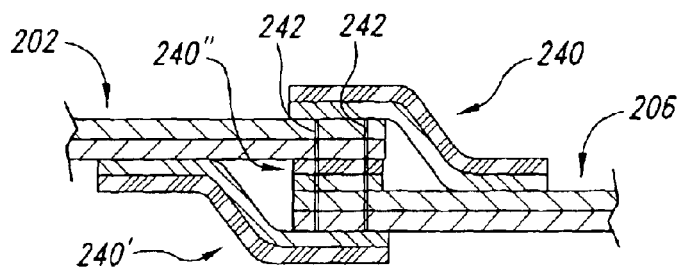
FIG. 14 is a sectional view of a stitched, lapped seam having interior and exterior laminate patches, according to another embodiment of the present invention.

FIG. 14 is a stitched version of the seam of FIG. 14, incorporating stitches 242 in addition to three laminate strips 240/240'/240". If the fabric's application necessitates an extremely strong seam, such a seam may be desired. The inner and outer laminate strips 240/240' independently prevent water from passing through not only the seam, but also along the stitches.

Figure 15:
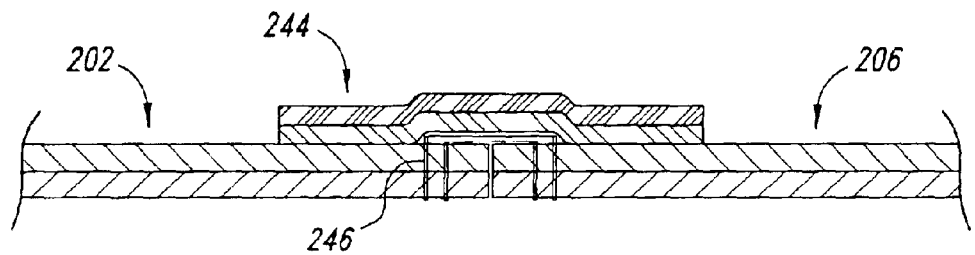
FIG. 15 is a sectional view of a stitched, butted seam having an exterior, laminate patch, according to another embodiment of the prevent invention.

FIG. 15 illustrates a butt seam in which a first panel 202 is attached by stitches 246 to a second panel 206. A laminate strip 244 is affixed to the outer surface of the seam to prevent water from passing through either the seam itself or the holes caused by the stitches 244.

Figure 16:
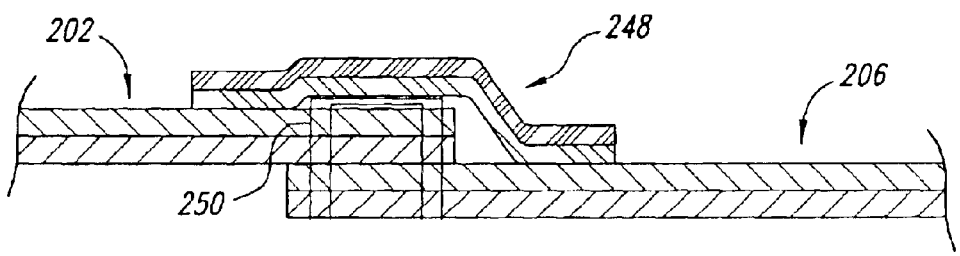
FIG. 16 is a sectional view of a laminate patch covering raised embossed stitching over a lap seam, according to another embodiment of the present invention.

FIG. 16 illustrates a stitched lap seam in which the first panel 202 is attached to the second panel 206 by raised and/or embossed stitches 248. The laminate strip 248 is affixed over the seam and the stitches 248 to prevent water from passing through the fabric or stitching.

Figure 17:
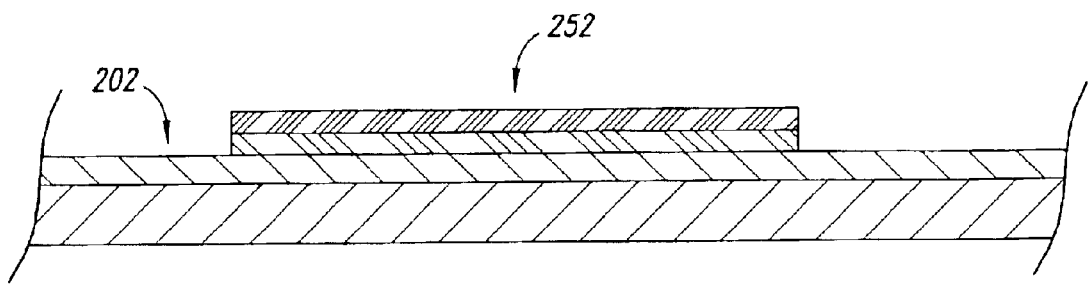
FIG. 17 is a sectional view of a laminate patch covering a portion of an outer woven layer of a layered, water repellent material, according to another embodiment of the present invention.

FIG. 17 illustrates a section of a panel 202 on which a laminate patch 252 is affixed. The laminate strip 252 can have any regular or irregular shape desired or preferred based on the location and application of the patch 252. The patch 252, for example, can be positioned on an area of highly abrasive activity, in order to increase the abrasion resistance of the panel 202. The patch 252 can also be positioned in a location where a sticker or other accessory is to be affixed, the patch 252 providing a foundation that has not been treated for water repellency, to facilitate the bond between the accessory and the panel 202.

Figure 18:
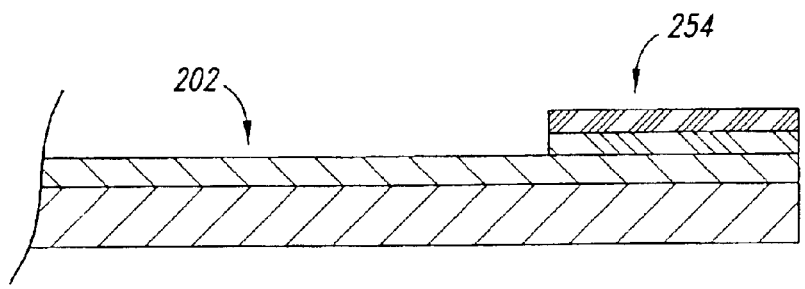
FIG. 18 is a sectional view of a laminate strip covering an edge portion of a layered, water repellent material, according to another embodiment of the present invention.

FIG. 18 illustrates the edge of a panel 202 of fabric, onto which a laminate strip 254 is affixed. The laminate strip 254 is bonded to the panel 202, and penetrates the fabric sufficiently to prevent the edge from fraying or delaminating.

Figure 19:
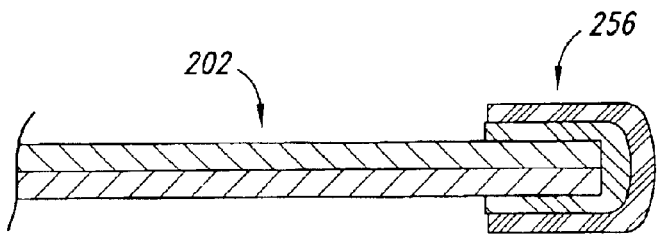
FIG. 19 is a sectional view of an edge of a layered water repellent material encapsulated by a laminate strip, according to another embodiment of the present invention.

FIG. 19 illustrates the edge of a panel 202 of fabric encapsulated by a laminate strip 256. The laminate strip 254 is bonded to the panel 202, and penetrates the fabric sufficiently from both sides to prevent the edge from fraying or delaminating.

Figure 20:
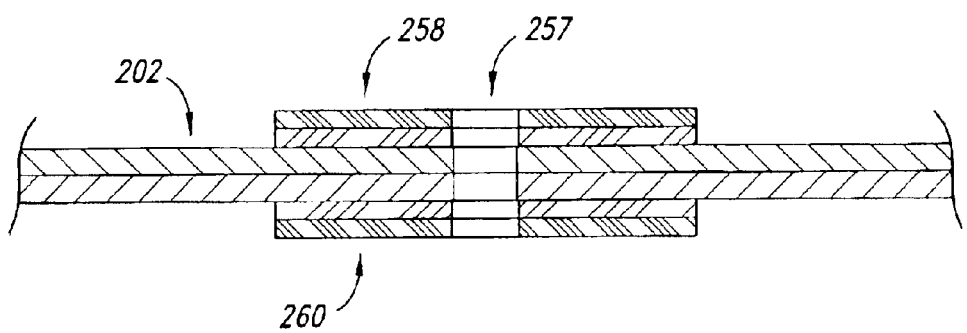
FIG. 20 is a sectional view of an aperture through a layered water repellent material having a woven outer layer, and including outer and inner busses made from laminate patches, according to another embodiment of the present invention.

FIG. 20 illustrates an opening 257 in a panel 202 of fabric, and outer and inner busses 258/260 encircling the opening. The busses 258/260 provide additional strength and structure to the opening 257, prevent water from penetrating into the panel 202, and prevent the panel from fraying at the opening.

Figure 21:
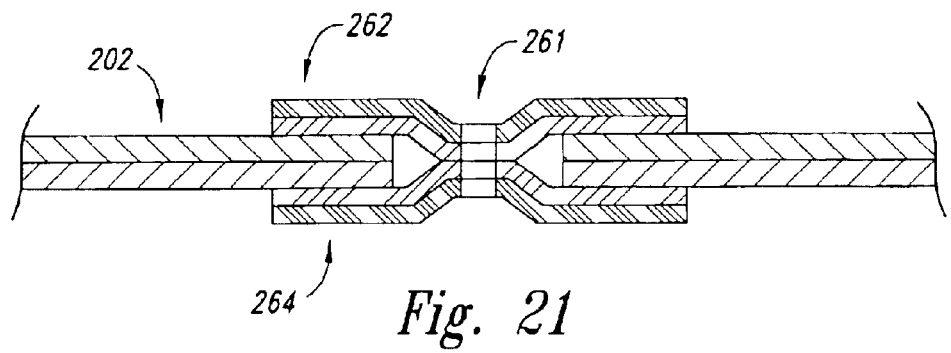
FIG. 21 is a sectional view of another aperture through a layered water repellent material having a woven outer layer, and including connecting outer and inner busses made from laminate patches, according to another embodiment of the present invention.

FIG. 21 illustrates another opening 261 in a panel 202 of fabric, and outer and inner busses 262/264 encircling the opening. The busses 262/264 provide additional strength and structure to the opening 261, prevent water from penetrating into the panel 202, and prevent the panel from fraying or delaminating at the opening.

Figure 22:
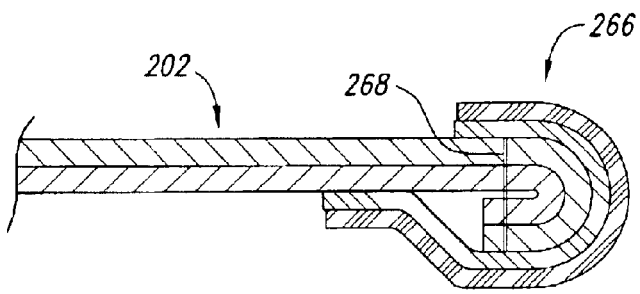
FIG. 22 is a sectional view of a hem sewn in a layered water repellent material, encapsulated by a laminate strip, according to another embodiment of the present invention.

FIG. 22 illustrates a sewn hem for a panel 202 of fabric, in which the hem is retained with a stitch 268, and is encapsulated in a fold of laminate strip 266. The laminate strip 266 prevents the fabric from fraying or delaminating and protects the folded fabric edge from premature wear.

Figure 23:
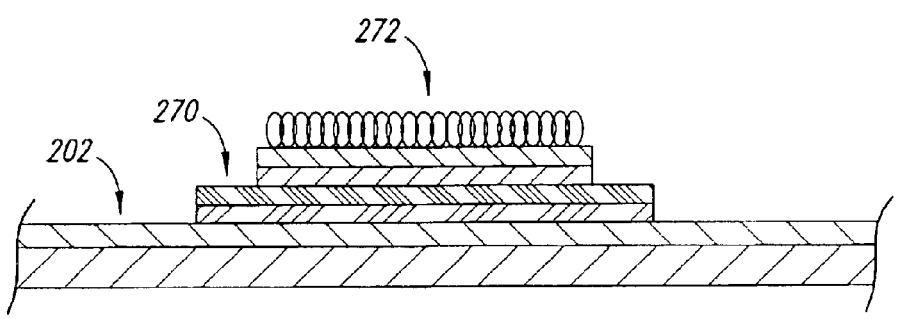
FIG. 23 is a sectional view of a laminate patch affixed to an outer woven layer of a layered, water repellent material, to which a section of hook and/or loop material has been bonded, according to yet another embodiment of the present invention, as viewed along Section 23—23 of FIG. 1.

FIG. 23 illustrates a section of a panel 202 on which a laminate patch 270 is affixed. The laminate patch 270 can have any regular or irregular shape desired or preferred based on the location and application of the patch. A section of ordinary adhesive backed hook-and-loop material is affixed to the outside surface of the patch 270. A similar patch of complementary hook-and-loop material can be affixed to mating portion of the product, or to another product, to allow the materials to be temporarily attached to each other.

Figure 24:
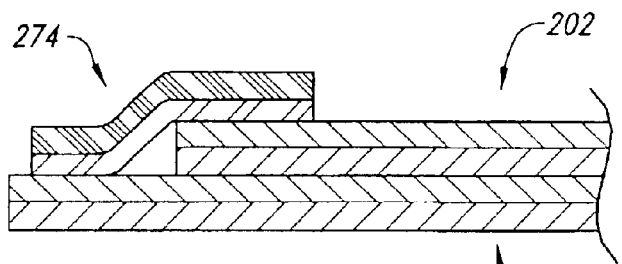
FIG. 24 is a sectional view illustrating a first step in the formation of a seam according to a certain method of the current invention.
Figure 25:
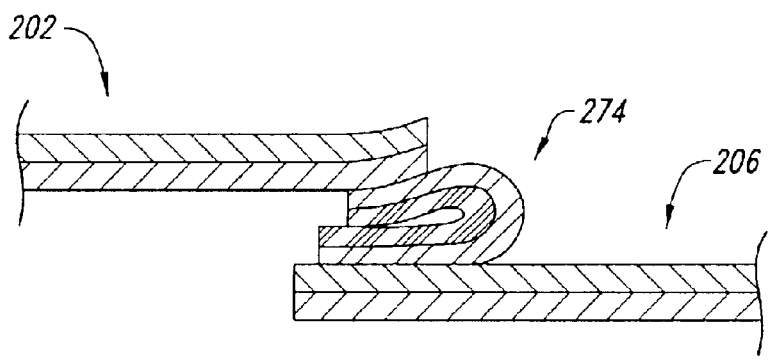
FIG. 25 is a sectional view illustrating a second step in the formation of a seam according to the certain method of the current invention.
Figure 26:
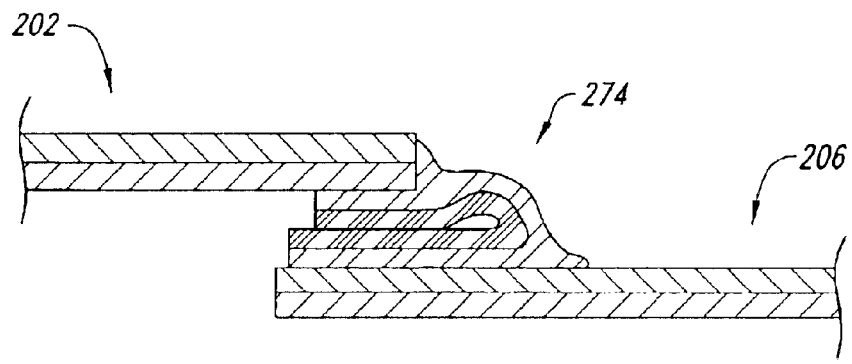
FIG. 26 is a sectional view illustrating an uncovered seam formed according to the certain method of the current invention.

FIGS. 24 through 26 illustrate one possible method of fabricating a seam according to the present invention. An early step in the procedure is illustrated in FIG. 24, in which an upper portion 202 of layered, water-repellent fabric is positioned over a lower portion 206 of layered, water-repellent fabric with the lower portion projecting beyond the upper portion. The upper portion 202 is oriented with its exterior layer downward (i.e., with the exterior surface against the exterior surface of the lower portion 206). A laminate strip 274 is positioned over the respective edges of the fabrics, extending from the upper portion 202 to the lower portion 206. The strip 274 is affixed to the two pieces of fabric in a manner such as one of those discussed above.

After the step illustrated in FIG. 24, the upper portion 202 is folded away from the lower portion 206, to create the configuration illustrated in FIG. 25. The exterior layer of the outer portion 202 is now facing in the same direction as the exterior layer of the inner portion 206. The laminate strip 274 is folded over upon itself, at least partially, and projects beyond the upper portion 202 in a direction away from the edge of the lower portion 206.

The seam is then pressed an additional time while in the configuration of FIG. 25. The additional pressing causes the adhesive layer of the laminate strip 274 to melt, and the adhesive wicks up into the fabric of the upper portion 202, and along the lower portion 206. The seam after this additional pressing is illustrated in FIG. 26. The ultimate seam provides excellent water repellency and strength.

Figure 27:
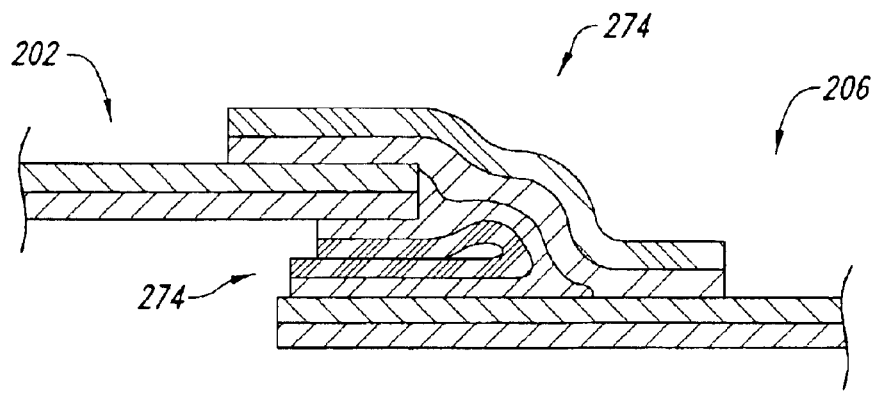
FIG. 27 is a sectional view illustrating a covered seam formed according to the certain method of the current invention.

FIG. 27 illustrates one possible additional step for adding to the seam fabricated through the steps illustrated in FIGS. 24–26. After the seam has been initially completed, another laminate strip 275 is positioned over the top of the initial seam, and is affixed to the seam as generally described above. The combination of the two laminate strips 274/275 creates additional strength in the seam. In addition, the bottom portion 276 of the first laminate strip 274, which had previously been exposed and could potentially attract lint, dust or other debris, is now encapsulated by the second laminate strip 275. The finished seam is now covered by the top layer 277 of the second laminate strip 275, which is not susceptible to debris adherence, and which is abrasion resistant. Depending on customer demand, the seams of FIGS. 26 or 27 can be provided on any particular garment.

FIGS. 28–31 illustrate various other alternate embodiments of the present invention. In general, these embodiments incorporate an additional layer in the adhesive system of the invention, a layer incorporating a co-polyester. When the adhesive system discussed above wicks deep into the fibers of the durable water resistant fabric, the heated co-polyester is carried along with it. The co-polyester can create an even stronger bond between the strip and the fabric, which can be useful under certain circumstances.

Figure 28:
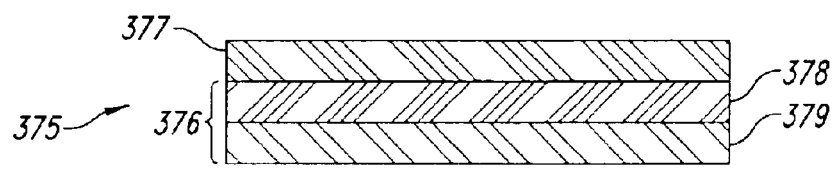
FIG. 28 is a cross section through a laminate material according to an alternate embodiment of the present invention.

FIG. 28 illustrates a section of laminate strip 375, generally incorporating an adhesive system 376 and a boundary layer 377 similar to those discussed above. In the illustrated embodiment, however, the adhesive system 376 is made up of a lower portion 379 and an intermediate layer 378. The lower portion 379 can be the same as the lower portion discussed in connection with the above embodiments. The intermediate layer 378 incorporates a co-polyester material.

Figure 29:
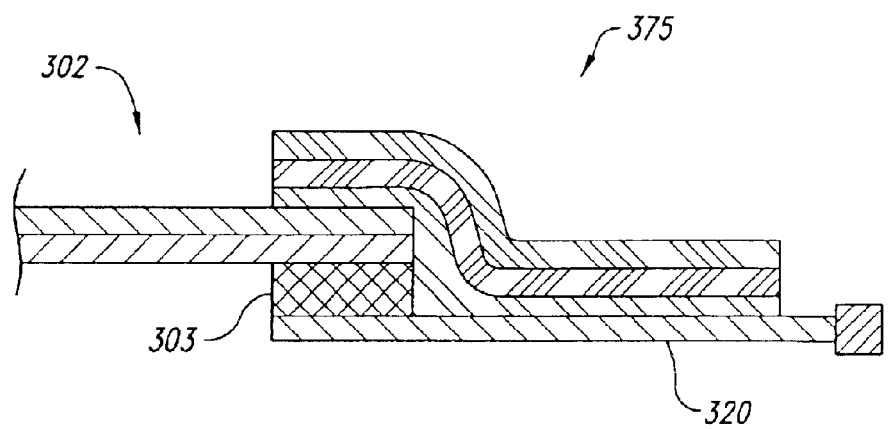
FIG. 29 is a sectional view of one side of a zipper and a section of a garment, incorporating a seal made from the laminate material of FIG. 28.
Figure 30:
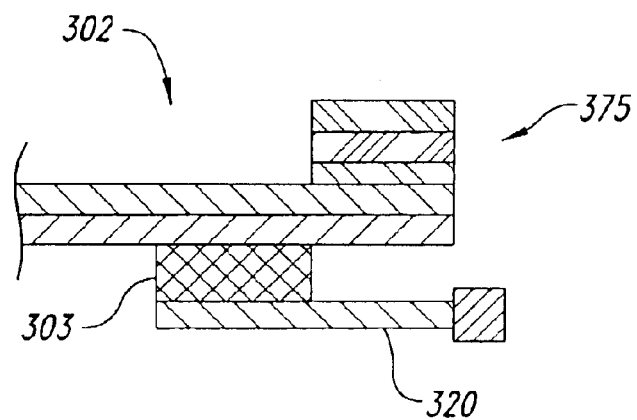
FIG. 30 is a sectional view of one side of another zipper and a section of a garment, incorporating a seal made from the laminate material of FIG. 28.

FIGS. 29 and 30 show two possible configurations in which the laminate strip 375 of this embodiment of the invention can be used along the edge or hem of a garment. In the particular embodiments illustrated, one side of a zipper 320 is bonded to a panel 302 of a garment. The inventor appreciates, however, that the laminate strip 375 can be used to bond other types of fasteners to fabric, or can be used alone to prevent the fabric edge from fraying and/or delaminating.

In the illustrated embodiments, the zipper 320 is attached to the panel 302 by a fastener 303, such as a traditional adhesive, stitching, or a laminate strip such as that discussed here or above. FIG. 29 illustrates an embodiment where the laminate strip 375 is laid over both the edge of the panel 302 and the fabric of the zipper 320. This embodiment can create additional water resistance at the zipper 320, and can significantly reduce or eliminate the possibility of the edge of the fabric delaminating or fraying.

FIG. 30 illustrates an embodiment where the laminate strip 375 is laid over only the edge of the panel 302. Although in the drawing the edge of the panel 302 is shown extending beyond the fastener 303, it is also appreciated that this version of the zipper 320 can have the edge of the panel terminate evenly with the edge of the fastener. In such an instance, the laminate strip 375 can be applied to the fabric prior to the fabric being trimmed. As a result, the fabric and the strip can be trimmed in the same cut, making the process more efficient. The illustrated embodiment of FIG. 30 can significantly reduce or eliminate the possibility of the edge of the fabric fraying, and possibly prevent delamination as well.

Figure 31:
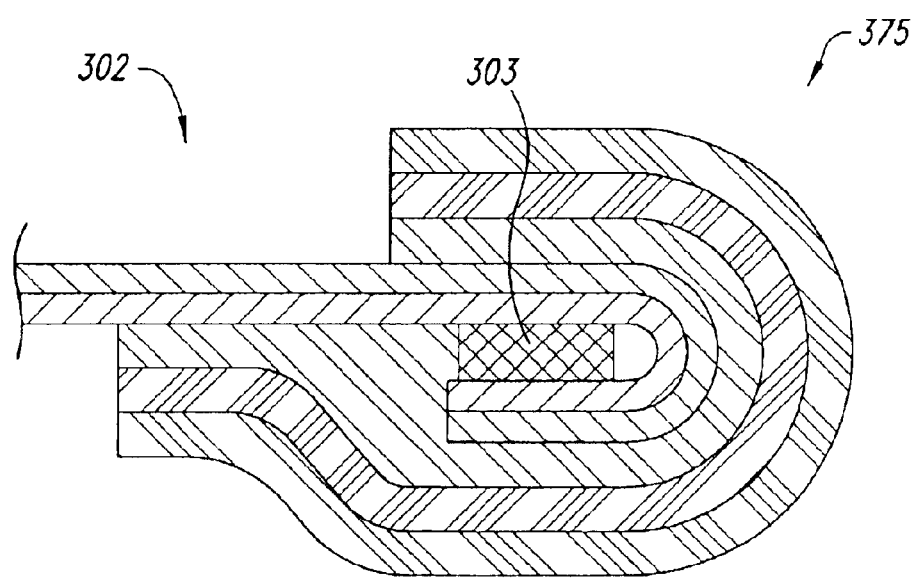
FIG. 31 is a sectional view of a hem from a garment, incorporating a seal made from the laminate material of FIG. 28.

FIG. 31 illustrates one possible hem incorporating this particular laminate strip 375. The panel 303 of the fabric is folded at its edge, and can be bonded with a fastener 303, such as a traditional adhesive, stitching, or a laminate strip according to the present invention. The laminate strip 375 is then folded over the hem and bonded according to one of the methods described above. In the illustrated embodiment, in addition to the lower portion 379 of the laminate strip 375 penetrating and encapsulating most of the fibers of the panel 302, the intermediate layer 378 also penetrates and encapsulates the fibers. An advantage of this particular embodiment is that a strong adhesive, such as that contained in the intermediate layer 378, may not penetrate as deeply if it weren't for the lower portion 379 first doing so. As such, this particular embodiment can be particularly useful in circumstances where additional strength is necessary or desired.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An edge for a multi-layered piece of fabric, the fabric having an outer layer that incorporates woven fibers treated with a liquid-repellent chemical, and an inner layer that incorporates a liquid-proof, breathable coating and/or membrane, the edge comprising:

an adhesive system comprising a first thermoplastic polymer, the adhesive system impregnating a majority of a thickness of the woven fibers in the outer layer of an edge region of the fabric so as to form an adhesive bond with the fabric, the adhesive bond being sufficient to prevent the edge region from fraying or delaminating during a useful life of the piece of fabric without the seam requiring stitching; and a second thermoplastic polymer chemically bonded to the adhesive system, the second thermoplastic polymer being sufficiently durable to endure a typical use of the piece of fabric for the useful life of the piece of fabric without the seam requiring stitching.

2. The edge of claim 1 wherein the adhesive system extends around the edge of the piece of fabric and adheres to the inner layer of the fabric in addition to the outer layer.

3. The edge of claim 1 wherein the edge is hemmed.

4. The edge of claim 1 wherein the edge is hemmed and stitched.

5. The edge of claim 1 wherein the edge is hemmed and at least the adhesive system extends around the edge of the piece of fabric.

6. The edge of claim 1 wherein the edge is hemmed and both the adhesive system and the second thermoplastic polymer extend around the edge of the piece of fabric.

7. The edge of claim 1 wherein the edge of the piece of fabric is hemmed and at least the adhesive system extends around the edge of the piece of fabric to adhere to the inner sheet of the fabric at a point beyond a terminal end of the hemmed fabric.

8. The edge of claim 1, further comprising an adhesive patch, an outer side of the patch incorporating one side of a hook and loop fastener combination, the inner side of the patch being bonded to the second thermoplastic polymer.

9. The edge of claim 1 wherein the adhesive system further comprising a co-polyester.

10. The edge of claim 1, further comprising a co-polyester layer.

11. The edge of claim 1, further comprising a co-polyester layer positioned between the adhesive system and the second thermoplastic polymer.

12. The edge of claim 1 wherein a peel resistance between the second thermoplastic layer and the fabric is greater than 4 lbf/in, as measured according to ASTM D-751-98, 2-inch strip modified grab method.

13. The edge of claim 1 wherein the adhesive bond with the fibers withstands more than 20 washing cycles without delaminating, as processed according to AATCC 124 using wash 2, III, A, ii.

14. The edge of claim 1 wherein the adhesive bond with fibers withstands more than 24 hours of continuous washing machine agitation without delaminating, according to the industry practice "wet flex and abrasion test."

15. The edge of claim 1 wherein the adhesive bond with the fibers withstands more than 5000 cycles of the "rotary platform double-head textile abrasion test" without delaminating, according to ASTM D3884-92.

16. A liquid-proof, breathable woven fabric, having enhanced resistance to abrasion and wear in selected areas, comprising:
    a sheet of a liquid-proof, breathable fabric, the sheet having a first side normally exposed to sources of abrasion and wear and comprising woven fibers having applied thereon a treatment that serves to provide liquid-repellency, and a second side comprising woven fibers having applied thereto a liquid-proof, breathable coating or having laminated thereto a liquid-proof, breathable membrane; and
    at least one overlay comprising a thermoplastic polymer laminate, the laminate having an adhesive system including a first thermoplastic polymer that is a low melting-point, high flow rate first adhesive, and a second layer including a second thermoplastic polymer, chemically bonded to the adhesive system, and being resistant to abrasion and wear,
    wherein the at least one overlay is sized and shaped so as to protectively and fixedly cover, by means of an adhesive bond, at least one discreet area of the first side of the sheet for which enhanced resistance to abrasion and wear is desired, the adhesive bond comprising an adhesion layer including at least some of the first thermoplastic polymer and at least some of the woven fibers of the fabric to be protected, wherein the at least some of the first thermoplastic polymer impregnates and surrounds the at least some of the woven fibers so as to form an adhesive bond therebetween; and wherein the second layer of the laminate is exposed, thereby presenting a thin, as well as abrasion and wear resistant surface overlaying a portion of the woven fabric to be protected.

17. The fabric of claim 16 wherein the adhesive system further comprises a co-polyester.

18. The fabric of claim 16 wherein the adhesive system further comprises a layer of co-polyester.

19. The fabric of claim 16 wherein the adhesive system further comprises a layer of co-polyester positioned between the first and second thermoplastic polymers.

20. The fabric of claim 16 wherein the overlay covers at least a portion of both the first side and the second side of the sheet.

21. A stitchless, liquid-impermeable and durable seam for an article of clothing made from fabric having an outer layer that incorporates woven fibers treated with a liquid-repellent chemical, and an inner layer that incorporates a liquid-proof, breathable coating and/or membrane, the seam comprising:
    a first thermoplastic polymer impregnating a majority of a thickness of the woven fibers in the outer layer of an overlapping region of an inner sheet of the fabric so as to form an adhesive bond with the inner sheet; and
    a second thermoplastic polymer chemically bonded to the first thermoplastic polymer, the second thermoplastic polymer being adhesively bonded to the liquid-proof, breathable coating and/or membrane of the inner layer of an overlapping region of an outer sheet of the fabric so as to form an adhesive bond with the outer sheet, the adhesive bonds between the outer sheet and the inner sheet being sufficiently strong and durable to endure a typical use of the article of clothing for a useful life of the article of clothing without the seam requiring stitching.

22. The stitchless, liquid-impermeable and durable seam of claim 21 wherein the seam strength in shear is greater than 80lbf/in, as measured according to ASTM D-751-98.

23. The stitchless, liquid-impermeable and durable seam of claim 21 wherein the first thermoplastic polymer impregnates a substantial majority of the thickness of the woven fibers of the outer layer of the inner sheet.

24. The stitchless, liquid-impermeable and durable seam of claim 21 wherein the first thermoplastic polymer impregnates the entire thickness of the woven fibers of the outer layer of the inner sheet.

25. The stitchless, liquid-impermeable and durable seam of claim 21 wherein the first thermoplastic polymer is selected from the group consisting of polyether polyurethanes.

26. The stitchless, liquid-impermeable and durable seam of claim 21 wherein the second thermoplastic polymer includes rubber, wax and organic solvents.

27. The stitchless, liquid-impermeable and durable seam of claim 21 wherein the thickness of the first thermoplastic polymer is about 0.075 mm and the thickness of the second thermoplastic polymer is about 0.10 mm.

28. The stitchless, liquid-impermeable and durable seam of claim 21 wherein the thickness of the first thermoplastic polymer is within a range of 0.020 mm to 0.250 mm, and wherein the thickness of the second thermoplastic polymer is within a range of 0.025 mm to 0.250 mm.

29. The stitchless, liquid-impermeable and durable seam of claim 21 wherein the woven fabric comprises nylon.

30. The stitchless, liquid-impermeable and durable seam of claim 21 wherein the woven fabric comprises polyester.

31. The stitchless, liquid-impermeable and durable seam of claim 21 wherein the liquid-proof, breathable coating comprises polyurethane.

32. The stitchless, liquid-impermeable and durable seam of claim 21 wherein the liquid-proof, breathable membrane comprises polyurethane.

33. The stitchless, liquid-impermeable and durable seam of claim 21 wherein the treating material providing liquid-repellency additionally provides stain-repellency.

34. The stitchless, liquid-impermeable and durable seam of claim 21 wherein the treating material providing liquid-repellency comprises a fluorine-containing resin.

35. The stitchless, liquid-impermeable and durable seam of claim 21 wherein the treating material providing liquid-repellency comprises a silicone resin.

36. The stitchless, liquid-impermeable and durable seam of claim 21, further comprising a waterproof, external cover extending across the seam from the outer sheet to the inner sheet, the cover having an inner layer of the first thermoplastic polymer impregnating a majority of the thickness of the woven fibers in the outer layer of a portion of each of the inner and outer sheets of the fabric proximate the seam so as to form a seal across the seam; and the cover having an outer layer of the second thermoplastic polymer sufficiently durable to protect the seam from abrasive damage during the typical use of the article of clothing.

37. The stitchless, liquid-impermeable and durable seam of claim 21, further comprising:
   a waterproof, external cover extending across the seam from the outer sheet to the inner sheet, the external cover having an inner layer of the first thermoplastic polymer impregnating a majority of the thickness of the woven fibers in the outer layer of a portion of each of the inner and outer sheets of the fabric proximate the seam so as to form a seal across the seam; and the cover having an outer layer of the second thermoplastic polymer sufficiently durable to protect the seam from abrasive damage during the typical use of the article of clothing; and
   a waterproof, internal cover extending across the seam from the outer sheet to the inner sheet, the internal cover having an outer layer of the second thermoplastic polymer, the outer layer being adhesively bonded to the liquid-proof, breathable coating and/or membrane of the outer and inner sheets.

* * * * *